United States Patent [19]

Tieleman et al.

[11] Patent Number: 5,569,072
[45] Date of Patent: Oct. 29, 1996

[54] POULTRY PROCESSING MECHANISM HAVING CARCASS STABILIZER

[75] Inventors: Ruldolf J. Tieleman, Kansas City, Kans.; Edward J. Tieleman, Erts, Andorra

[73] Assignee: Johnson Food Equipment, Inc., Kansas City, Kans.

[21] Appl. No.: 589,116

[22] Filed: Jan. 19, 1996

[51] Int. Cl.$^6$ .............................. A22B 5/00; A22C 21/00
[52] U.S. Cl. ........................................... 452/185; 452/117
[58] Field of Search ................................ 452/185, 188, 452/177, 179, 180, 117, 118, 120, 122

[56] References Cited

U.S. PATENT DOCUMENTS

| | | |
|---|---|---|
| 3,958,303 | 5/1976 | Scheir et al. . |
| 4,019,222 | 4/1977 | Scheir et al. . |
| 4,136,421 | 1/1979 | Scheir et al. . |
| 4,257,142 | 3/1981 | Hathorn et al. ........................ 452/120 |
| 4,262,387 | 4/1981 | Scheir et al. . |
| 4,265,001 | 5/1981 | Hathorn et al. ........................ 452/120 |
| 4,266,322 | 5/1981 | Van Mil ................................ 452/120 |
| 4,382,314 | 5/1983 | Graham ................................ 452/118 |
| 4,669,148 | 6/1987 | Scheir . |
| 4,788,831 | 12/1988 | Crawford et al. . |
| 5,299,976 | 4/1994 | Meyn ....................................... 452/106 |

Primary Examiner—Willis Little
Attorney, Agent, or Firm—Hovey, Williams, Timmons & Collins

[57] ABSTRACT

A carcass holding fixture for transporting, locating and securely stabilizing a carcass relative to the fixture while the fixture is moving and processing operations are carried out on the carcass has a pair of hip stabilizing arms that squeeze inwardly against opposite sides of the carcass and upwardly against the hips as the carcass is clamped into processing position. When the stabilizing arms are fully closed, the carcass is clamped up against a straddle bar on the fixture. Simultaneously, a shoulder stabilizing yoke adjacent the neck portion of the carcass has raised up into firm engagement with the shoulders of the carcass to eliminate the possibility of significant movement of the trunk portion of the carcass. Once the processing operations are complete, the hip stabilizing arms swing away from the carcass and the shoulder stabilizing yoke moves to a lower position whereby to completely release the carcass and allow it to be separated from the holding fixture and moved to the next processing station.

19 Claims, 3 Drawing Sheets

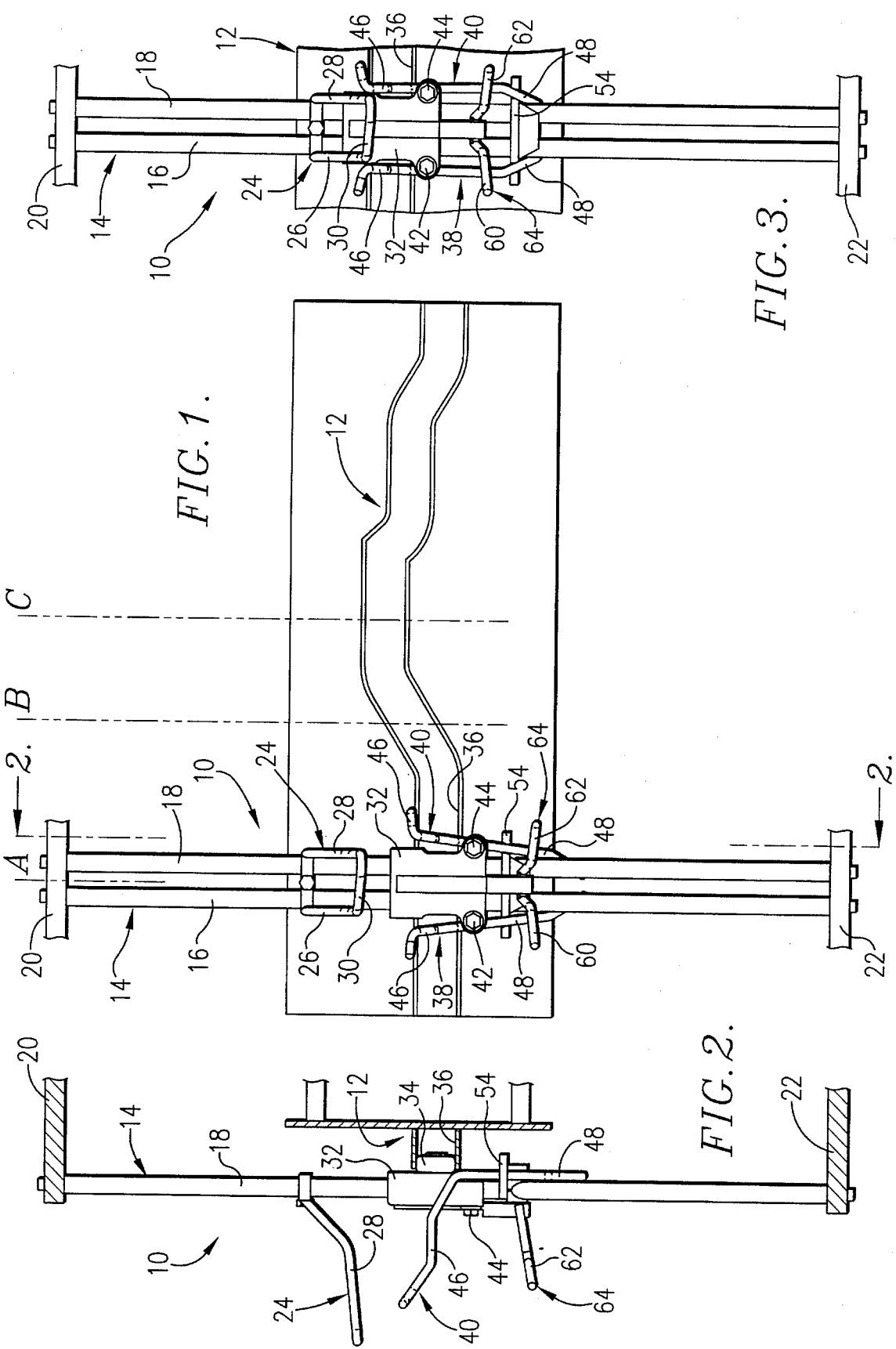

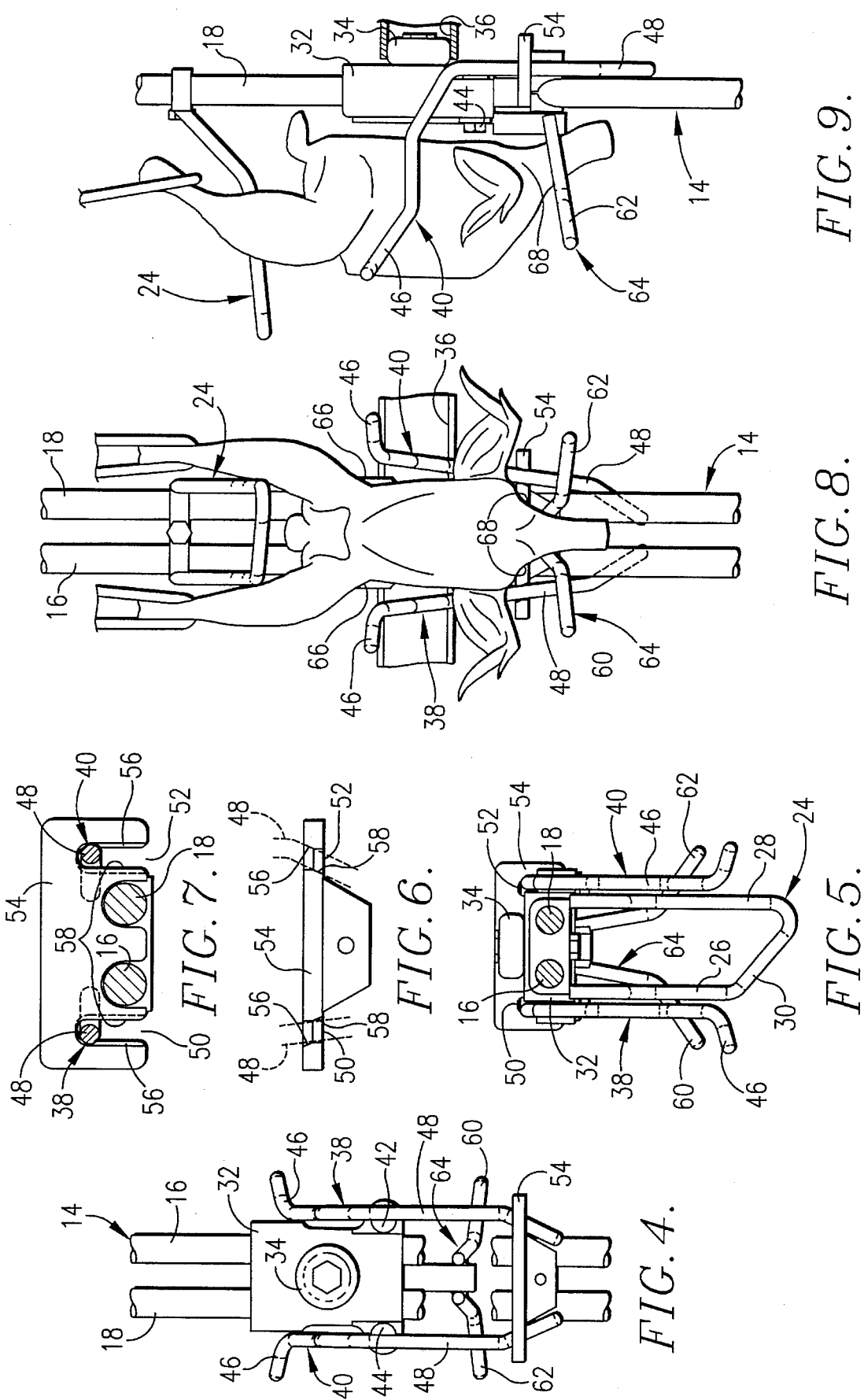

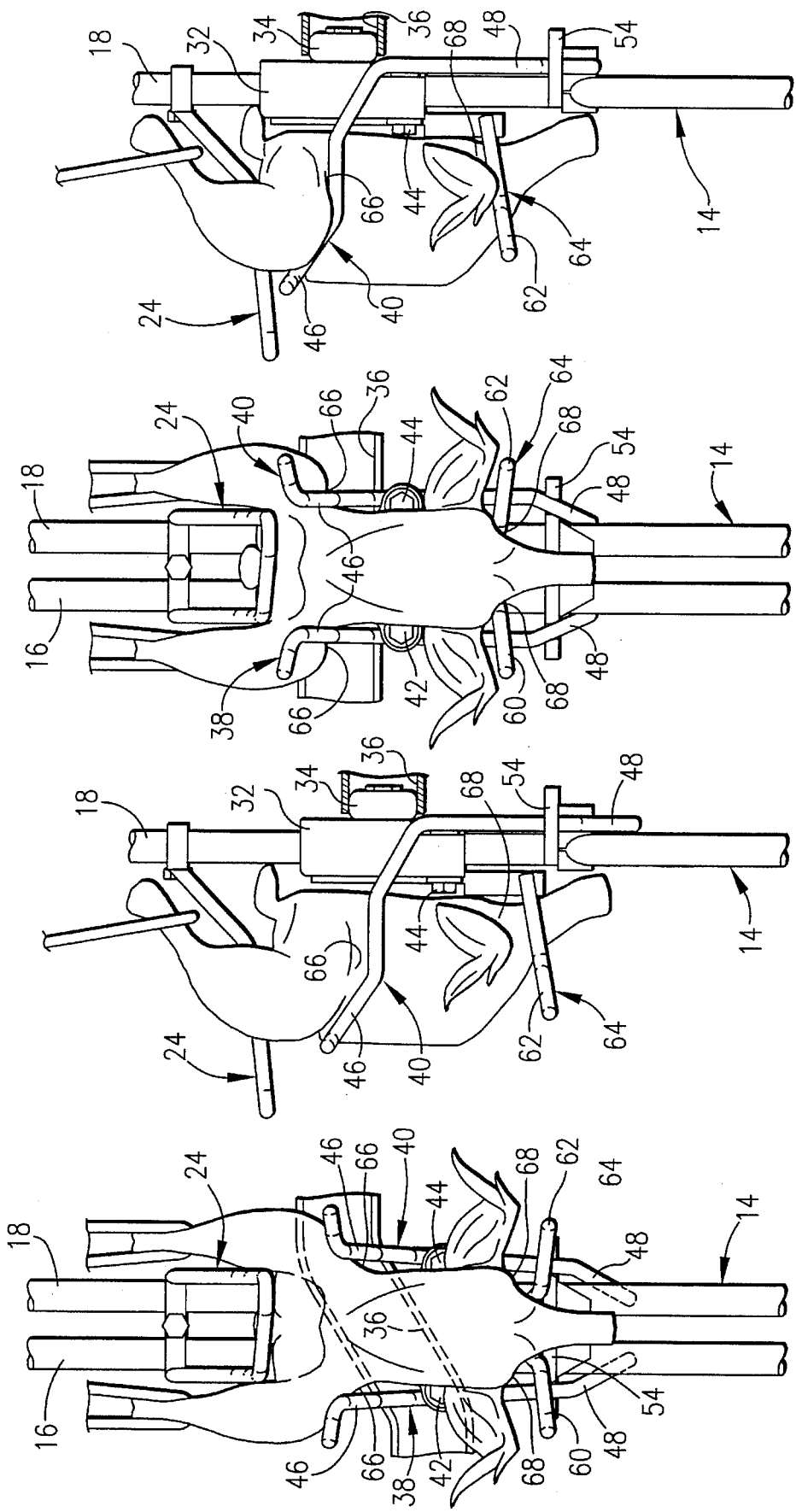

POULTRY PROCESSING MECHANISM HAVING CARCASS STABILIZER

TECHNICAL FIELD

This invention relates to poultry processing equipment and, more particularly, to an improved way of stabilizing and securely holding a poultry carcass in a proper position for performing processing functions of various kinds on the carcass as it moves along a high speed conveyor line.

BACKGROUND

It is important to hold the poultry carcass in a motionless condition and in the proper position as processing operations are carried out on the carcass. If the carcass moves around or is not precisely located, the processing tool nay damage the carcass, be incapable of performing its function accurately, or otherwise cause the operation to be carried out in a manner that results in a lower yield of acceptable carcasses at the discharge end of the line.

One important consideration is the need to locate the vent end of the carcass at precisely the same point time after time, regardless of minor variations in bird size, so that processing tools such as a vent cutter, a body cavity opener and an eviscerator can carry out their repetitious movements using the vent end as a reference point. This allows the cuts to be made in the same way each and every time without penetrating too deeply into the poultry carcasses, without damaging the sensitive organs and entrails, and without removing excessive amounts of edible meat in the area where the cuts are being made. Furthermore, the motion of an eviscerating tool within the body cavity can be more effectively controlled so as to remove the viscera without damage and without leaving behind entrails that should have been removed. If the carcass is cocked, canted or off to one side of the supporting fixture, the processing tools cannot perform their intended functions.

SUMMARY OF THE INVENTION

Accordingly, one important object of the present invention is to provide improved carcass stabilizing mechanism for use in a high speed, high volume poultry processing facility where the carcasses are moved rapidly through the various processing stations of the plant on a continuously moving conveyor system.

Another important object of the present invention is to provide a stabilizing mechanism that is equally useful in connection with a variety of different types of processing machines at stations which perform different processing functions on the carcass.

A further important object of the invention is to provide a stabilizing mechanism that streamlines entry and exit of a carcass to and from a moving fixture of a processing machine to minimize problems at that location. In this respect, an important benefit of the present invention is the elimination of guide rods and similar types of deflecting structure at the carcass entry and exit points of the machine.

In addition, it is an important object of this invention to provide a way of not only holding the carcass in a more secure manner than has heretofore been available, but also of centering the carcass while it is in the process of being secured so that the position in which the carcass is ultimately held is the proper and best position of the carcass for carrying out the processing operations.

In carrying out the above objects, as well as others not specifically mentioned, the present invention contemplates a relatively simple, uncluttered fixture having a rigid locating loop that projects outwardly in a horizontal condition from the fixture and serves as a locating bar that is straddled by the legs and thighs of the carcass as it is suspended from its hocks by an overhead conveying system. Specially configured, cam-operated, pivotal arms on the fixture swing inwardly and upwardly after the carcass has straddled the locating bar so as to engage the carcass by its hips and force it up against the bar. Since the arms move symmetrically and simultaneously during this action, they not only lift the carcass up against the bar but also center it on the fixture so that the carcass is properly aligned for the processing tool. Simultaneously, a shoulder stabilizer yoke on the fixture rises up into stabilizing engagement with the shoulders of the carcass to help hold the carcass against movement. After the processing operation has been completed, the hip and shoulder stabilizers release the carcass, allowing it to be quickly and easily transferred away from the machine by the conveying line.

BRIEF DESCRIPTION OF THE DRAWINGS

FIG. 1 is a front elevational view of an improved carcass holding fixture and operating cam track therefor incorporating the principles of the present invention, only a single fixture and a simplified flat, linear operating cam track being illustrated so as to facilitate a full and complete understanding of the principles of the present invention;

FIG. 2 is a fragmentary vertical cross-sectional view of the single fixture and linear operating track of FIG. 1 taken generally along sight line 2—2 of FIG. 1;

FIG. 3 is a fragmentary front elevational view of the fixture and operating track similar to FIG. 1 but showing the hip and shoulder stabilizers in their fully operated positions in which a carcass is clamped up against the stationary straddle bar of the fixture:

FIG. 4 is an enlarged, rear fragmentary elevational view of the fixture in a relaxed position corresponding to that of FIG. 1;

FIG. 5 is a horizontal, top cross-sectional view through the fixture taken just above the stabilizer bar;

FIG. 6 is an enlarged front elevational view of stationary cam structure on the reciprocal mounting block of the fixture illustrating the way in which the hip stabilizing arms are cammed into and out of their clamping engagement with the hips of the carcass;

FIG. 7 is a fragmentary top horizontal cross-sectional view of the fixture taken just above the stationary, notched cam plate of FIG. 6;

FIGS. 8 and 9 are fragmentary front and side elevational views respectively of the fixture and poultry carcass corresponding generally to the condition of things when the fixture is in region A of FIG. 1;

FIGS. 10 and 11 are fragmentary front and side elevational views respectively of the fixture and carcass corresponding generally to the condition of things when the fixture is in region B of FIG. 1; and FIGS. 12 and 13 are fragmentary front and side elevational views respectively of the fixture and carcass corresponding generally to the condition of things in region C of FIG. 1 in which the carcass is fully secured and stabilized for processing.

DETAILED DESCRIPTION

The carcass stabilizing mechanism of the present invention is illustrated in FIG. 1 in connection with a fixture 10 which is suitable for use with a variety of different processing tools (not shown) for performing operations on a poultry carcass as it is conveyed along a path of travel. For the sake of clarity, only a single fixture 10 has been illustrated, and the operating cam track 12 which operates the movable carcass stabilizing components of the fixture 10 as it moves from left to right in FIG. 1 has been illustrated in a flat, linear pattern. As well understood by those skilled in the art, however, in actual practice a processing machine incorporating the principles of the present invention would be provided with several of the fixtures 10 so that a number of carcasses would be handled by the machine simultaneously. Furthermore, the operating cam track 12 would preferably be arranged in a circular pattern with the fixtures moving on a carousel around the track.

The fixture 10 includes a support frame 14 comprising a pair of upright, parallel guide rods 16,18 fixed to a pair of upper and lower members 20 and 22 respectively. The frame 14 is moved from left to right viewing FIG. 1 by a conveying line (not shown) carrying a succession of poultry carcasses to be processed. The path of travel of the conveying line and the path of travel of the support 14 intersect and coincide with one another during the period of time that a particular processing operation is carried out on the carcass.

The fixture 10 also includes a rigid straddle bar 24 that is fixed to the guide rods 16,18 and projects outwardly therefrom at such a level that the legs of the poultry carcass straddle the bar 24 (see FIGS. 8–13) during operation. The bar 24 is preferably in the nature of a rigid loop having a pair of parallel legs 26,28 projecting outwardly from the guide rods 16,18 and a diagonal bight 30 interconnecting the legs 26 and 28 at their outer ends. The leg 26 is shorter than the leg 28 as illustrated best in FIG. 5 such that the straight bight 30 extends diagonally from the short leg 26 toward the longer leg 28 at an approximate 45° angle. Both of the legs 26,28 are upturned slightly so as to initially project downwardly and outwardly from the guide rods 16,18 and then substantially horizontally outwardly to the bight 30.

The fixture 10 also includes a support block 32 slidably received upon the guide rods 16,18 and reciprocable vertically thereon toward and away from the straddle bar 24. A cam following roller 34 on the backside of the block 32 is received within the track 36 of the operating cam track 12 for effecting the up and down movement of the block 32.

The block 32 carries a pair of hip stabilizers 38 and 40 on corresponding, fore-and-aft extending, laterally spaced pivots 42 and 44 at its lower end. The hip stabilizers 38,40 are swingable about the pivot connections 42,44 toward and away from one another between open or released positions as in FIG. 1 and closed or clamped positions as in FIG. 3. Each stabilizer 38,40 comprises a generally inverted, L-shaped lever arm (see FIG. 2) having an upper, carcass engaging leg portion 46 that projects generally outwardly and upwardly from the plane of reciprocation of the block 32, and a lower, upright, cam operated leg portion 48 that extends generally parallel to the path of reciprocation of the block 32. The carcass engaging leg portion 46 flares outwardly adjacent its outermost end, while the lower cam operated leg portion 48 flares inwardly at its terminal portion. It will be seen that the pivot connections 42 and 44 are located between the upper and lower leg portions of each hip stabilizer 38,40 such that legs 46 and 48 are effectively located on opposite sides of the corresponding pivot connection 42 or 44.

The lower ends of the cam operated leg portions 48 are received within forwardly opening cam slots 50 and 52 (FIG. 7) in a stationary cam plate 54 that is fixed to the guide rods 16 and 18 below the reciprocable support block 32. The cam slot 50 corresponds to the stabilizer arm 38 while the cam slot 52 corresponds to the stabilizer arm 40. As illustrated in FIGS. 6 and 7, the slots 50,52 are cut vertically through the plate 54 on an incline so that the axes through the two slots 50,52 converge downwardly toward one another. This produces a sloping outboard cam slot edge 56 and a sloping inboard cam slot edge 58 for each slot. As will be seen, the inboard cam edges 58 bear against the lower legs 48 of hip stabilizers 38 and 40 as the block 32 rises, thus swinging the upper legs 46 inwardly toward one another, while the outboard cam slot edges 56 bear against the legs 48 when the block 38 is descending, thus causing the upper legs 46 to swing away from one another.

The fixture 10 also includes a pair of shoulder stabilizers 60 and 62 which comprise laterally spaced members of a yoke-shaped device fixed to the support block 32 at a distance below the pivots 42 and 44. The shoulder stabilizing yoke 64 projects outwardly and slightly downwardly from the plane of the guide rods 16,18, the outermost ends of the stabilizers 60 and 62 flaring outwardly to facilitate the entry and exit of the shoulder and neck region of the carcass during processing operations. It will be seen that the yoke 64 is centered with respect to the longitudinal axis of the fixture 10. It will be further noted that while the hip stabilizing arms 38 and 40 swing in and out relative to the yoke 64, both the yoke 64 and the arms 38,40 rise and fall together during reciprocation of the support block 32 due to their common attachment to the block 32.

Operation.

The fixture 10 travels from left to right viewing FIG. 1. When the fixture is within region A of FIG. 1, the block 32 is in its lowermost position and both the hip stabilizers 38,40 and the shoulder stabilizing yoke 64 are in a relaxed condition. During this time the carcass is swung into the fixture 10 with its breast facing outwardly as illustrated in FIGS. 8 and 9. The legs of the carcass are positioned on opposite sides of the straddle bar 24, and the neck of the carcass is slipped into the crotch of the shoulder stabilizing yoke 64. The hip stabilizing arms 38 and 40 are spaced away from the carcass at this time, and the shoulder stabilizing yoke is spaced below the shoulders of the carcass.

As the fixture 10 and the suspended carcass move to the right and approach region B of FIG. 1, the follower roller 34 on the back of the support block 32 encounters a rise in the track 36 which causes the block 32 to move up toward the straddle bar 24 as shown in FIGS. 10 and 11. This causes the inboard edges 58 of cam slots 50,52 in plate 54 to bear against the lower legs 48 of hip stabilizers 38,40, causing the upper legs 46 thereof to swing inwardly toward one another. Because the hip stabilizers 38 and 40 are rising with the block 32 at the same time they are camming toward one another, the upper ends of the hip stabilizers 38 and 40 move upwardly toward the straddle bar 24 at the same time they are moving inwardly toward the hips 66 of the carcass. This action has the effect not only of engaging the carcass by its hips and lifting it toward the straddle bar 24, but also of centering the carcass on the fixture 10. At the same time, the shoulder stabilizing yoke 64 is moving upwardly closer to the shoulders 68.

By the time the fixture 10 reaches region C in FIG. 1, the rise in the track 36 has been completed and the track has flattened out at its elevated position. In this region of the track, the hip stabilizers 38,40 and the shoulder stabilizing yoke 64 are fully clamped against the carcass and the vent end of the carcass has been pushed up against the straddle bar 24 as illustrated in FIGS. 12 and 13. The trip stabilizers 38 and 40 have lifted the carcass by the hips 66 up against the straddle bar 24, and the stabilizing yoke 64 has firmly clamped up against the shoulders 68. Thus, the carcass is securely held in a centered, immovable position in readiness for various processing operations such as vent cutting, body cavity opening and eviscerating to be carried out thereon. After those processing steps have been completed, the support block 32 is lowered, causing the hip stabilizers 38,40 and the shoulder stabilizing yoke 64 to release downwardly and outwardly from the carcass. Thereupon, the carcass may be swung outwardly away from the fixture 10 and transported by its overhead shackle conveying line to the next processing station.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state their intent to rely on the Doctrine of Equivalents to determine and assess the reasonably fair scope of their invention as pertains to any apparatus not materially departing from but outside the literal scope of the invention as set out in the following claims.

We claim:

1. In a fixture for holding a poultry carcass in a stabilized condition during processing operations on the carcass, the improvement comprising:

a central straddle bar adapted to project between the legs of the carcass when the carcass is positioned on the fixture in an inverted condition with its hocks up; and a pair of hip stabilizers located below the straddle bar and on opposite sides thereof for clamping the carcass generally by its hips up against the straddle bar, said hip stabilizers being swingable symmetrically toward one another and movable jointly upwardly toward the bar during clamping of the carcass against the straddle bar.

2. In a fixture as claimed in claim 1; and a pair of shoulder stabilizers below said hip stabilizers and movable up into stabilizing engagement generally with the shoulders of the carcass when the carcass is clamped against the straddle bar by the hip stabilizers.

3. In a fixture as claimed in claim 1, said hip stabilizers being swingably mounted on a common support for lateral swinging movement toward and away from one another, said support being shiftable in a direction to move said hip stabilizers toward the straddle bar as the carcass is clamped against the straddle bar.

4. In a fixture as claimed in claim 3, said hip stabilizers being provided with cam structure engageable with the stabilizers and disposed for causing the stabilizers to swing toward one another as they are moved toward the straddle bar.

5. In a fixture as claimed in claim 4, said cam structure comprising a stationary member having a pair of camming surfaces engaged with the stabilizers, said stabilizers being configured to induce a swinging reaction in the stabilizers as they are drawn against the surfaces during movement toward the straddle bar.

6. In a fixture as claimed in claim 5, each of said hip stabilizers comprising a lever arm having a pivotal connection with said support between opposite ends of the lever arm, said lever arm having a carcass-engaging portion on one side of the pivotal connection with the support and a cam-engaging portion on the opposite side of the pivotal connection with the support.

7. In a fixture as claimed in claim 6; and a pair of shoulder stabilizers below said hip stabilizers and movable up into stabilizing engagement generally with the shoulders of the carcass when the carcass is clamped against the straddle bar by the hip stabilizers.

8. In a fixture as claimed in claim 7, said shoulder stabilizers being mounted on said common support of the hip stabilizers for simultaneous movement with the hip stabilizers when the hip stabilizers are moved toward the straddle bar.

9. In a fixture as claimed in claim 8, said shoulder stabilizers comprising a pair of laterally spaced legs on a generally yoke-shaped device projecting outwardly from the path of travel of the support.

10. In a fixture as claimed in claim 2, said hip stabilizers being swingably mounted on a common support for lateral swinging movement toward and away from one another, said shoulder stabilizers being fixed to said support below the hip stabilizers, said support being shiftable in a direction to move said hip stabilizers and said shoulder stabilizers toward the straddle bar as the carcass is clamped against the straddle bar.

11. In a fixture as claimed in claim 10, said shoulder stabilizers comprising a pair of laterally spaced legs on a generally yoke-shaped device projecting outwardly from the path of travel of the support.

12. In a fixture as claimed in claim 11; and stationary cam structure disposed for operable engagement with said hip stabilizers during movement thereof toward the straddle bar, each of said hip stabilizers comprising a lever arm having a pivotal connection with said support between opposite ends of the lever arm, said lever arm having a carcass-engaging portion on one side of the pivotal connection with the support and a cam-engaging portion on the opposite side of the pivotal connection with the support.

13. In a fixture as claimed in claim 12, each of said lever arms having a generally inverted L-shaped configuration, said cam-engaging portion of each lever arm lying in a plane extending generally parallel with the path of movement of the hip stabilizers toward the straddle bar, and said carcass engaging portion of each lever arm lying in a plane extending generally outwardly from the path of movement of the hip stabilizers toward the straddle bar.

14. In a fixture as claimed in claim 1; and mechanism for causing said swinging and upward movement of the hip stabilizers in response to shifting of the fixture along a prescribed path of travel.

15. In a fixture as claimed in claim 1;

a pair of shoulder stabilizers below said hip stabilizers and movable up into stabilizing engagement with the shoulders of the carcass when the carcass is clamped against the straddle bar by the hip stabilizers; and mechanism for causing said upward movement and said swinging of the hip stabilizers and said upward movement of the shoulder stabilizers in response to shifting of the fixture along a prescribed path of travel.

16. In a machine for performing processing operations on a line of poultry carcasses suspended by their hocks and moving in spaced succession along a prescribed path of travel, the improvement comprising:

a series of movable frames disposed to intersect the line of carcasses and move in concert therewith along a portion of said path of travel;

a central straddle bar on each frame adapted to project between the legs of a carcass associated with the frame;

a support on each frame mounted for up and down movement generally toward and away from the straddle bar;

a pair of hip stabilizers canned on the support below the straddle bar and on opposite sides thereof, said hip stabilizers being pivotally mounted on the support for swinging movement toward and away from one another and for travel with the support during its up and down movement;

cam structure on the frame disposed for operating engagement with the hip stabilizers during their upward movement with the support for causing the stabilizers to swing toward one another and clamp the carcass generally by its hips up against the straddle bar, said cam structure further being disposed for operating engagement with the hip stabilizers during their downward movement with the support for causing the stabilizers to swing away from one another and release the carcass from the straddle bar;

a pair of shoulder stabilizers on said support below the hip stabilizers and movable into and out of stabilizing engagement generally with the shoulders of the carcass in synchronism with the hip stabilizers whereby to cooperate with the hip stabilizers in maintaining the carcass securely controlled during processing operations; and interengageable cam means along said path of travel and on the support of each movable frame for effecting said up and down movement of the support as the frame travels along said portion of the prescribed path of travel.

17. In a machine as claimed in claim 16, each of said hip stabilizers comprising a lever arm having a pivotal connection with said support between opposite ends of the lever arm, said lever arm having a carcass-engaging portion on one side of the pivotal connection with the support and a cam-engaging portion on the opposite side of the pivotal connection with the support.

18. In a machine as claimed in claim 17, each of said lever arms having a generally inverted L-shaped configuration, said cam-engaging portion of each lever arm lying in a plane extending generally parallel with the path of movement of the hip stabilizers toward the straddle bar, and said carcass-engaging portion of each lever arm lying in a plane extending generally outwardly from the path of movement of the hip stabilizers toward the straddle bar.

19. In a machine as claimed in claim 18, said shoulder stabilizers comprising a pair of laterally spaced legs on a generally yoke-shaped device projecting outwardly from the path of travel of the support.

* * * * *